Dec. 12, 1967

J. PICANOL 3,357,307

PROCESS AND MACHINES FOR MANUFACTURING BEVEL OR HYPERBOLOID GEARS

Filed Oct. 15, 1965

INVENTOR.
J. Picanol
BY Richards y Geier
ATTORNEYS

Fig. 7

Dec. 12, 1967　　　　　　J. PICANOL　　　　　　3,357,307
PROCESS AND MACHINES FOR MANUFACTURING
BEVEL OR HYPERBOLOID GEARS
Filed Oct. 15, 1965　　　　　　　　　　　　15 Sheets-Sheet 4

INVENTOR.
J. Picanol
BY Richards & Geier
ATTORNEYS

INVENTOR.
J. Picanol
BY
ATTORNEYS

Dec. 12, 1967  J. PICANOL  3,357,307
PROCESS AND MACHINES FOR MANUFACTURING
BEVEL OR HYPERBOLOID GEARS
Filed Oct. 15, 1965  15 Sheets-Sheet 7

INVENTOR.
J. Picanol
BY
Richards & Geier
ATTORNEYS

INVENTOR.
J. Picanol

Fig. 19

INVENTOR.
J. Picanol
BY
Richards & Geier
ATTORNEYS

Dec. 12, 1967

J. PICANOL 3,357,307

PROCESS AND MACHINES FOR MANUFACTURING BEVEL OR HYPERBOLOID GEARS

Filed Oct. 15, 1965

INVENTOR.
J. Picanol
BY Richards & Geier
ATTORNEYS

United States Patent Office 3,357,307
Patented Dec. 12, 1967

3,357,307
PROCESS AND MACHINES FOR MANUFACTURING BEVEL OR HYPERBOLOID GEARS
José Picanol, Calle Latorre 124, Sabadell, Barcelona, Spain
Filed Oct. 15, 1965, Ser. No. 496,620
Claims priority, application Belgium, July 23, 1965, 667,283
3 Claims. (Cl. 90—5)

The process with which the present invention is concerned relates to the production of bevel and hyperboloid gears with curved teeth, for which it is customary to use tools known as "face mill cutters" and machines belonging to the continuous division type as well as to the type with intermittent division. The curvature of the teeth obtained with the first type is cycloidal, whereas with the others, it is circular.

It is a well known fact that in such pairs of bevel and hyperboloid gears, it is absolutely necessary to provide a certain clearance between the operating flanks in order to obtain a smaller contact surface.

The value of this clearance mainly depends on the load to which the gears will be subjected and on the sturdiness of the support and the bearings.

Until now, in order to obtain this reduced contact surface it was necessary either to cut the gears in several steps with cutters of different diameters, or to change the position of the cutters on the holder, or even to change several adjustments of the machine.

An object of the present invention is a process by means of which it is possible to obtain with a considerable degree of accuracy any desired contact surface in the longitudinal direction of the teeth, and this in a very simple way, by adjusting one single element and without it being necessary to change anything whatever to the cutter itself. The process mainly consists in imparting to the axis of the cutter, during its operation, a slight additional translatory motion in a direction which is practically perpendicular to the general direction of the teeth, whereby this additional motion changes sense about half way the width of the teeth.

This characteristic additional motion of the cutter axis is variable to a great extent and may be, for instance, a straight-line reciprocating motion, a circular reciprocating motion, a circular continuous motion, an axial reciprocating motion or may follow any other appropriate direction.

This same process can also be applied to any appropriate cutting motion, whether continuous (safe mill cutter) or not (reciprocating tools). Just like aforesaid characteristic additional motion, this continuous or reciprocating cutting motion can itself be considerably variable to a great extent namely, it may be a: straight-lines reciprocating motion, circular reciprocating motion, circular continuous motion, axial reciprocating motion or any other suitable motion.

Another object of the present invention concerns the devices and machines suitable for applying this process.

The characteristic features of the process and of the devices and machines conforming to the present invention will be described below with reference to the appended drawings of which.

Figures 1, 2, 3, 4, 5, 6:
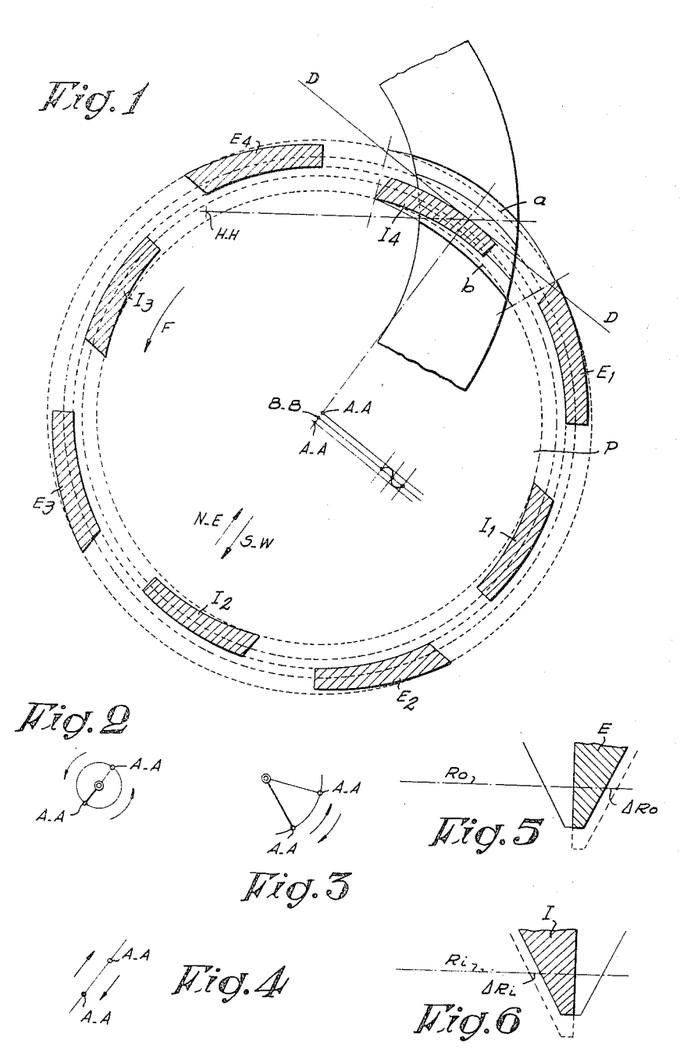
FIGURE 1 illustrates the process conforming to the present invention, whereby the additional motion has been considerably magnified for the sake of a better comprehension.
FIGURES 2, 3 and 4 are diagrammatic representations of variants of the additional motion conforming to the present invention.
FIGURES 5 and 6 respectively show an outer and an inner cutting blade of a circular cutter.

In FIGURE 1, which is a diagrammatic illustration of the process according to the present invention, the outer blades are shown at E-1, E-2, E-3, and E-4, while the inner blades are shown at I-1, I-2, I-3, I-4, whereby the cutter P rotates in the direction of arrow F.

In the position shown, the cutting edge of the inner blade I-4 is just leaving the tooth hollow whilst the cutting edge of the outer blade E-1 is about to enter same.

If the axis of cutter P did not move, the concave flank cut by the outer blades E and the convex flank cut by the inner blades I would both be perfectly circular. These concentric lines are shown respectively in a–b.

Considering the conditions as illustrated in FIGURE 1, if, whilst the tool P rotates in the direction of arrow F, the axis A—A of the cutter is gradually displaced in the North-Easterly direction, i.e., at right angles to the general DD of the toothing, until the edge of the outer blade E-1 reaches the middle of the toothing, and if aforesaid axis A—A is then gradually returned to its initial position until aforesaid outer blade E-1 comes off aforesaid toothing, the concavity, of the flank cut by this blade will be more pronounced. Similarly if, during its passage in the hollow of the following blade, which in the present instance is blade I-1, the axis of the cutter is moved in a South-Westerly direction in the diagram of FIGURE 1, until the cutting edge of this blade reaches in turn the middle of the toothing, and if it is then brought back to its starting point, the convexity of the flank cut by this blade will be reduced. By inverting aforesaid additional displacements of the cutter axis A—A, of course the contrary effect will be obtained, i.e. in the present instance a lesser concavity and a larger convexity. Whilst the cutter is operating, its axis does therefore describe an additional to-and-fro movement in one sense for one blade and in the opposite sense for the following one, whence it follows that the tool as a whole in only subjected to one single periodic motion while operating, whereby the complete cycle of this motion corresponds to the passage of two successive blades of the cutter, which are respectively an outer blade and an inner blade. In the case shown diagrammatically in FIGURE 1, the cutter P comprises four pairs of cutting blades which are regularly spaced apart. For each revolution of the cutter whilst operating, its axis A—A must therefore describe four additional to-and-fro movements.

It follows from this arrangement that the deviation between the flanks actually cut by applying the process of the present invention and the flanks which would have been cut if axis A—A of the cutter had been held in a fixed position, depends on the amplitude of the motion of the axis, on the condition controlling this motion, i.e. on the velocity and the acceleration involved therein, and finally, on the direction and sense of this motion.

In fact, the amplitude and the sense of aforesaid additional motion determine the radius of curvature of the flanks, i.e. the length of the reduced bearing area. The direction of this additional motion controls the location, i.e. the relative position of aforesaid bearing surface.

The law of motion is a constant of the machine.

It should be mentioned that the additional translatory motion impressed onto axis A—A of the cutter whilst the latter is cutting, might as well be a continuous circular motion (FIGURE 2) as a reciprocating circular motion (FIGURE 3) or even a simple reciprocating straightline motion (FIGURE 4).

The description given below refers to the application of the process for obtaining a reciprocating circular additional motion of the tool. It could of course be applied to both other motions which in fact are only variants of the former obtained respectively by reducing or increasing indefinitely the radius of rotation.

For a reciprocating additional motion as illustrated diagrammatically in FIGURES 3 and 4, use can be made of a cam drive, which has the advantage of making it possible to impart to the axis displacement any desired form of motion by simply replacing the cam. It is even possible to impart to the cutter axis motions which are different for both flanks, which enable a particularly accurate adjustment to be made of the contact surface both in length and with respect to its relative position.

The process conforming to the present invention is quite general in this sense that it does not only make it possible to obtain a reduced bearing surface which is determined by a transversal additional displacement of the axis of the tool, i.e. a motion such that the axis always remains parallel to itself, but also to obtain the same result by impressing such additional motion by means of an axial to-and-fro displacement of aforesaid axis. In fact, the process according to the present invention incorporates the fact that aforesaid additional motion must take place at right angles to the general direction of the teeth, so that this condition automatically includes aforesaid additional axial motion. In this respect, in FIGURE 5, there is a diagrammatic representation has been given of an outer cutting blade E of a circular knife. If, when this blade passes in the hollow of a tooth, the knife in question is given a slight gradual advance until the cutting edge is almost at the middle of the toothing, and if subsequently aforesaid cutter is given a slight backward motion, the radius of curvature of the concave flank will have been increased by a quantity $\Delta Ro$, which means that its concavity will have been reduced.

Similarly, FIGURE 6 illustrates diagrammatically an internal cutting blade I of the same cutter. By impressing to the latter the same additional motion, the radius of curvature of the convex flank is diminished by an amount $\Delta Ri$, which means that its convexity increases.

In this particular form of embodiment, one and the same axial displacement of the cutter produces on the flanks of the teeth opposite effects, whereas in the former case, one and the same translatory motion of the cutters' axis produces identical effects.

The result is that in this particular instance, one and the same axial to-and-fro motion of the cutting blades must take place for each cutter blade, which means for instance that, since the cutter illustrated diagrammatically in FIGURE 1 comprises eight equally spaced blades, its axis will have to go through eight axial to-and-fro motions for each turn of the cutter.

A first machine of the intermittent division type applying the process according to the present invention and making use of a circular knife and a reciprocating additional motion of the axis thereof, such as shown diagrammatically in FIGURE 3, is illustrated in FIGURES 7 to 16. In this instance, as well as for the other examples, the basic machine belongs to a type known as such but which has been adapted for applying the process according to the present invention.

The general disposition of this machine is similar to that of the machine described in the U.S. Patent No. 2,000,015 taken merely by way of example.

Figure 7:
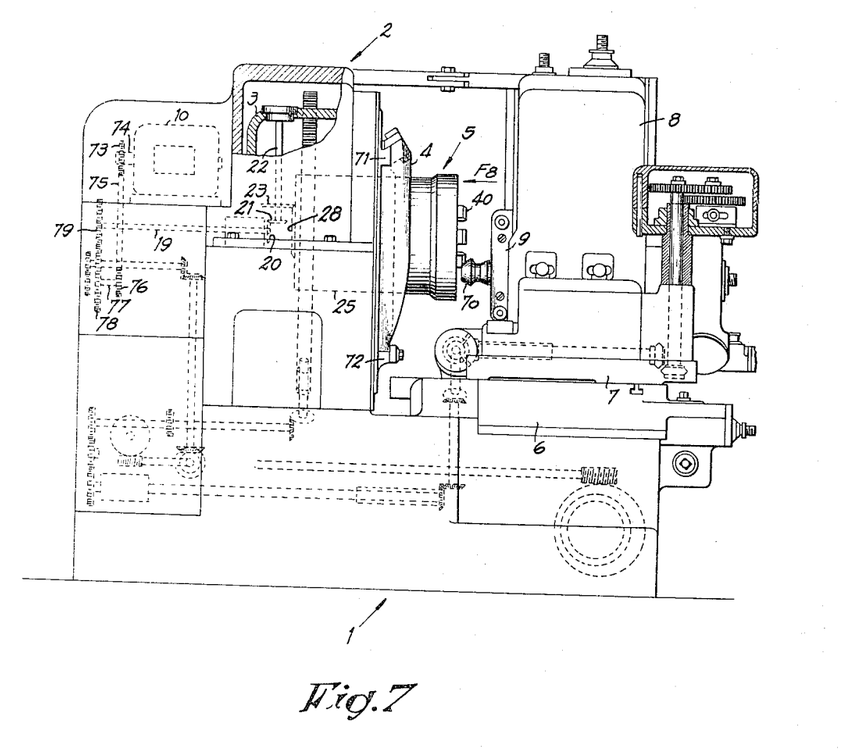
FIGURE 7 is a diagrammatic side-view, given by way of example, of a machine described in United States Patent No. 2,000,015 and which has undergone changes for applying the process according to the present invention.

This machine comprises a base 1 carrying a frame 2 of enclosed type in which a cradle 3 can rock. This cradle carries a slider 4 which, in turn, carries the actual toolholder 5. Upon the base 1 can also be displaced a base slider 6 carrying a support 7 which can be angularly adjusted and carries a column 8 along which the slider of the workpiece-holder 9 can be displaced.

The kinematic sequence, i.e. the whole of the movable elements which provide the proper operation of the machine driven by motor 10, is also identical to that of the machine which has been described in aforesaid U.S. Patent No. 2,000,015 except with respect to the control of the toolholder-head.

The only difference between the machines according to the present application and that of aforesaid U.S. patent is the toolholder-head 5 and its drive. The other mechanisms are identical to those of aforesaid U.S. patent and common to the various forms of embodiments illustrated by the appended drawings.

Figure 8:
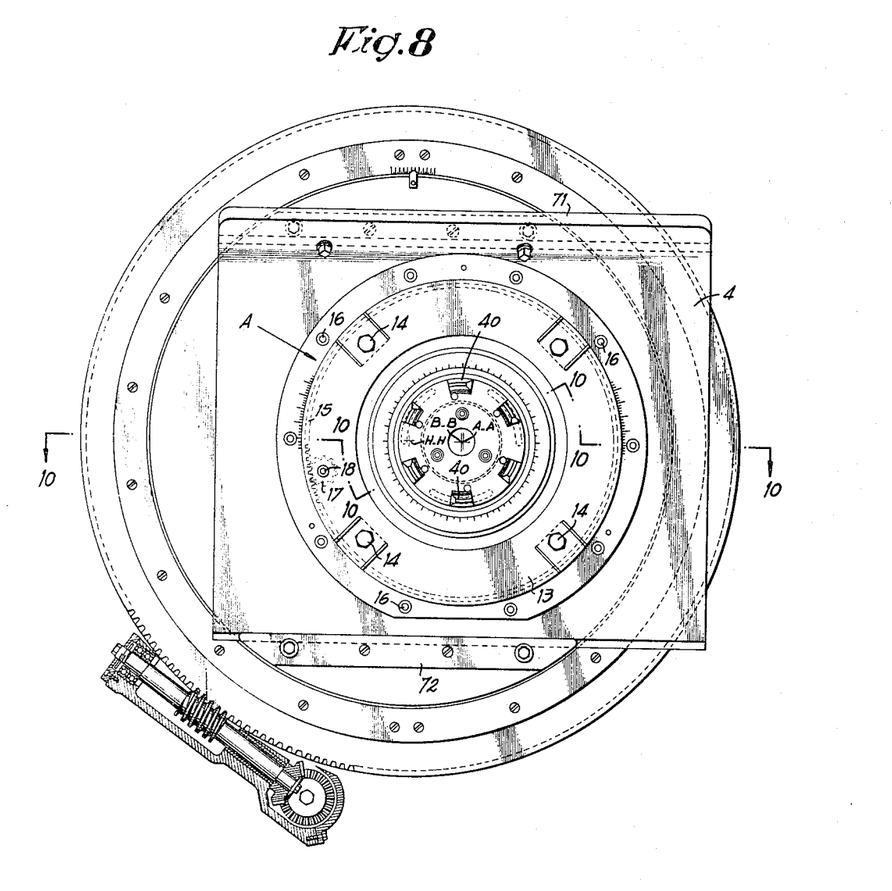
FIGURE 8 is a partial front view in the direction of arrow F8 of FIGURE 7.
Figure 9:
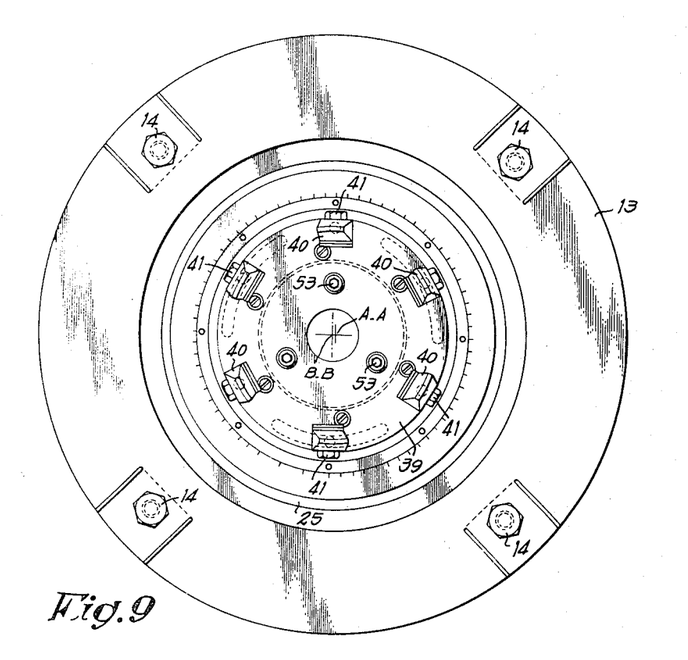
FIGURE 9 shows, on an enlarged scale, the central part marked "A" in FIGURE 8.

Aforesaid toolholder-head 5 is fitted in a circular opening 11 provided in aforesaid slider 4. It is held therein by the co-operation, on the one hand, of that part of the shaped annular rib 12 engaging the corresponding shoulder of aforesaid circular opening 11 and the slider 4 and, on the other hand, of a clamping ring 13 attached to aforesaid peripheral rib 12 by the pressure screws 14. This ring also rests on part of a crown wheel 15 with internal teeth, located in a front chamber of slider 4 and fastened to the latter by screws 16. A pinion 17, housed in an opening of aforesaid ring 13 engages aforesaid crown wheel 15 and has an accessible shaft stump 18 by means of which it is possible to adjust the toolholder-head with respect to the slider 4.

In aforesaid U.S. patent, that part of the kinematic sequence directed toward the toolholder-head leads to a shaft 19 which is in continuous rotation when motor 10 is operating. This shaft is the prime element of the drive in all toolholder-heads variants.

In the examples of FIGURES 10 to 16, the various characteristic features of the present invention are illustrated as well as the elements of their driving mechanism providing a machine for cutting the flanks of bevel or hyperboloid gears by means of tools in continuous rotation and the axis of which is subject to an additional translatory motion similar to that provided in the case of FIGURE 3.

Figure 10:
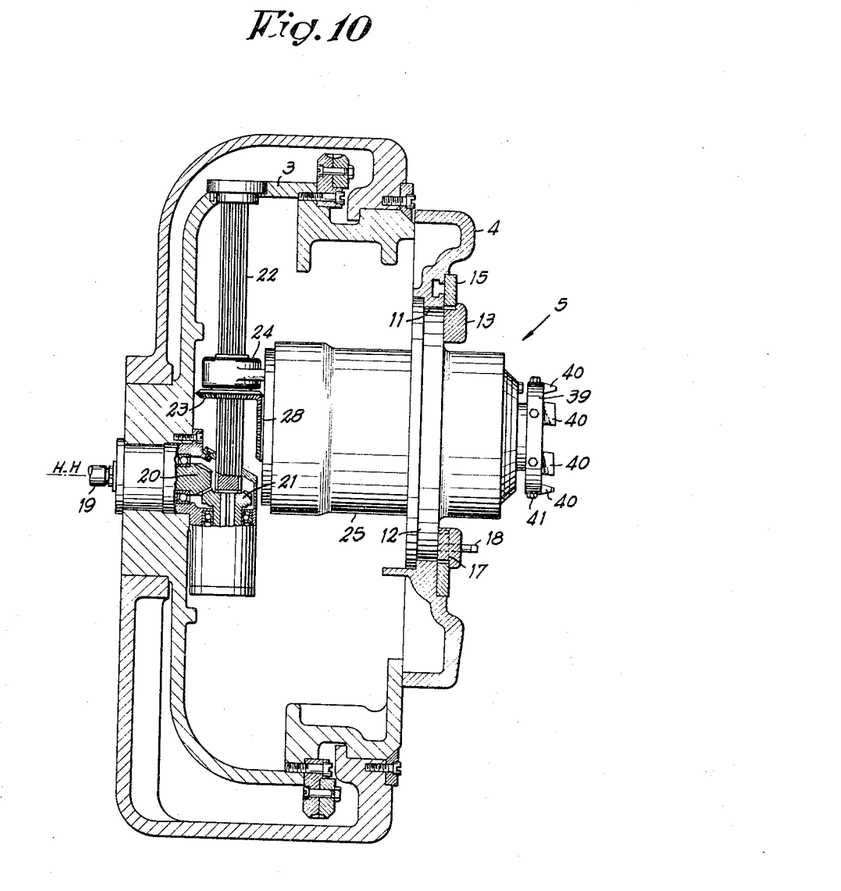
FIGURE 10 is a section along the lines 10—10 of FIGURE 8.
Figure 11:
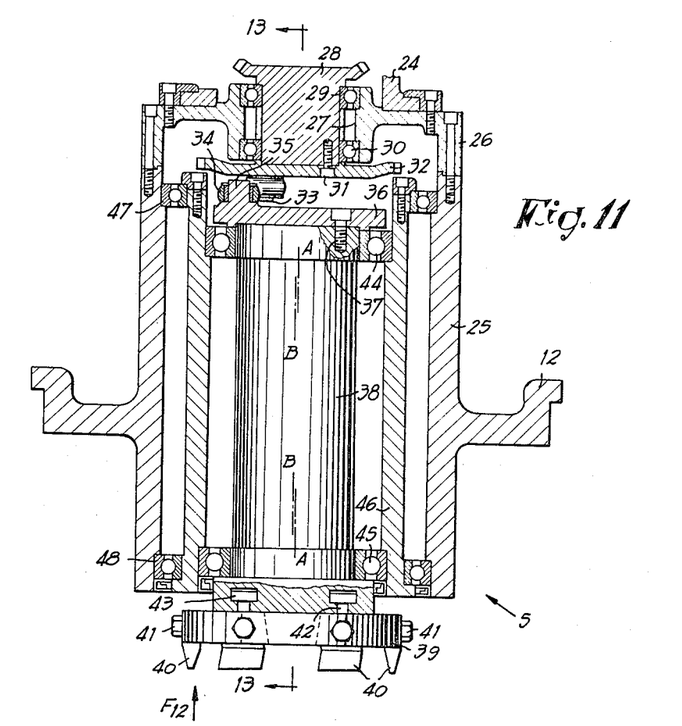
FIGURE 11 represents an axial cross-section of a tool holdre which applies the process of the present invention.
Figure 12:
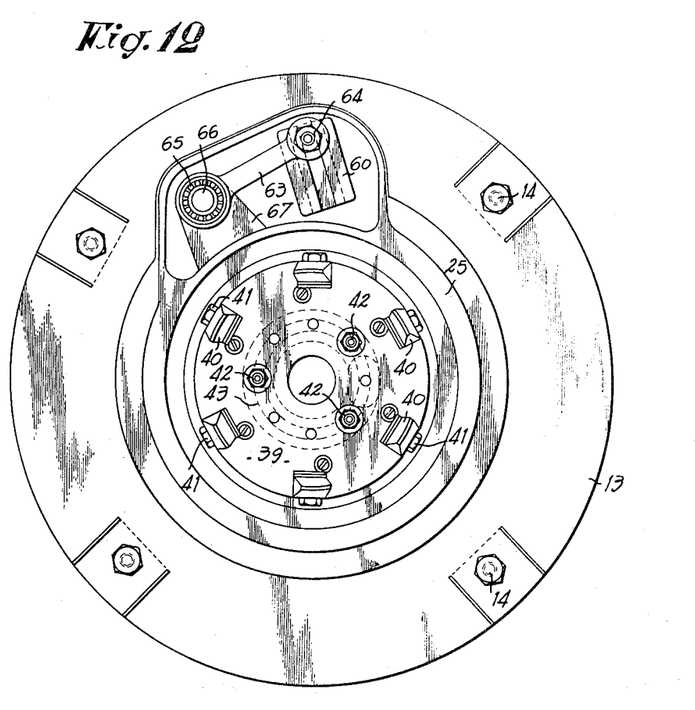
FIGURE 12 is a front view in the direction of arrow F12 of FIGURE 11.
Figure 13:
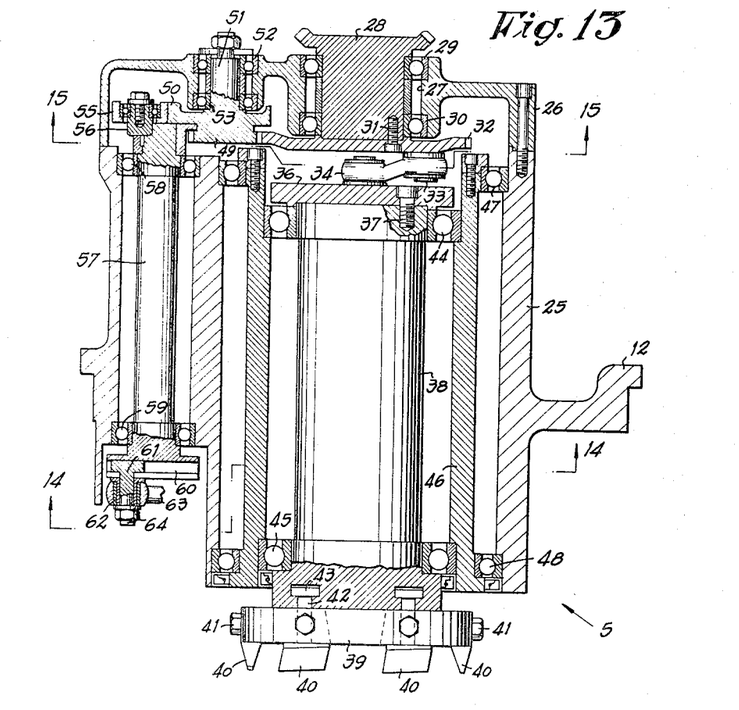
FIGURE 13 is a cross-section according to line 13—13 of FIGURE 11.
Figure 14:
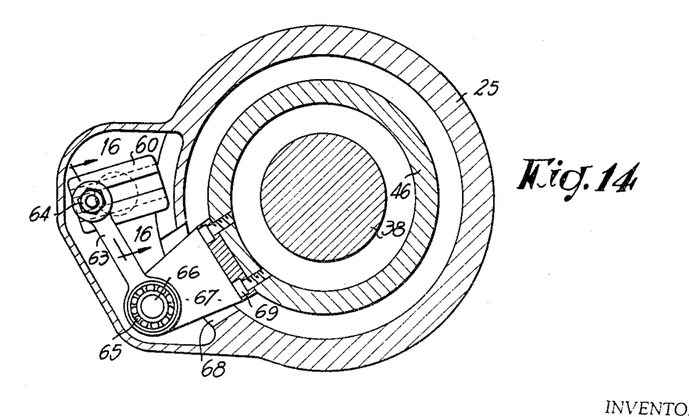
FIGURES 14 and 15 are respectively cross-sections along the lines 14—14 and 15—15 of FIGURE 13.
Figure 15:
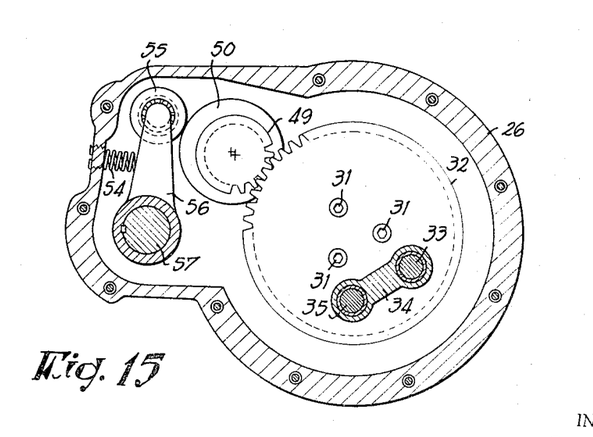
Figure 16:
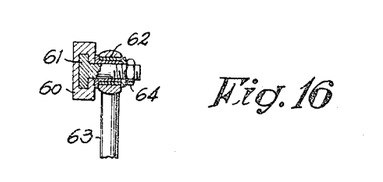
FIGURE 16 is a cross-section along the line 16—16 of FIGURE 14.

In this construction, and more particularly as illustrated in FIGURE 10, a pinion 20, keyed to shaft 19, engages a pinion 21 mounted on the fluted shaft 22. The latter engages bevel gear 23 of which the internally fluted hub is supported by ball bearings which themselves are supported on a bushing 24 fastened to the housing 25. The latter has a shaped annular rib 12 engaging with an easy fit aforesaid opening 11 of slider 4. The rear flange 26 which closes aforesaid tubular housing 25 has a central opening into which is engaged the hub of a bevel gear 28 in constant mesh with aforesaid bevel gear 23 sliding along the fluted shaft 22. Aforesaid bevel gear 28 is supported on aforesaid flange by ball bearings 29–30. Onto the rear face of the hub of aforesaid bevel gear 28 is fastened by means of screws 31, a toothed plate or disc 32. The latter carries a crank pin 33 connected by means of a connecting rod 34 to a second crank pin 35 carried by the terminal end 36 fixed by screws 37 to shaft 38 on the outer end of which is fastened the plate 39 carrying the tools 40 which are fastened thereonto by screws 41. The angular position of aforesaid plate 39 with its tools 40 can be changed, respectively adjusted, by operating in the proper sense the prism-head bolts 42 engaged in a circular groove 43 of proper cross-section provided for this purpose in said shaft 38. The latter is supported by means of ball bearings 44–45 in the lower face shoulders of a tubular piece 46 which itself is supported by ball bearings 47–48 in the inner face shoulders of aforesaid housing 25.

This construction is such that aforesaid shaft 38 (A—A) is out of center with respect to aforesaid tubular sleeve 46 (B—B).

This excentricity results from the fact that the housings of aforesaid bearings 44–45 in aforesaid tubular sleeve 46 are out of center with respect to the latter. The result is that, when aforesaid sleeve 46 is moved by a certain angle, this changes the relative position between the excentric parts. According to the present invention, these displacements of aforesaid sleeve 46 are preferably obtained by operating in the proper sense a driving device of aforesaid tubular sleeve 46 in a reciprocating circular motion.

This device mainly consists of a pinion 49 fastened to a cam 50, whereby their common axis 51 is supported by ball bearings 52–53 housed in the shoulder provided for this purpose in the rear flange 26 of housing 25. A roller 55, the pivot of which is mounted at the end of a level 56 of which the other end is keyed onto a shaft 57 parallel to the longitudinal axis of the toolholder device, is pushed into permanent contact with aforesaid cam 50 by means of a spring 54.

The lower end of aforesaid axis 57 is designed as a slide 60 which is engaged by the prismatic head of a pivot 61 which is engaged with an easy fit and via an appropriate sleeve 62 by one of the ends of a connecting rod 63 which is prevented from coming off aforesaid pivot 61 by a clamping nut 64. The other end of aforesaid connecting rod 63 is engaged by means of a ball bearing 55 on the pivot 66 fastened to an arm 67 passing through an opening 68 of housing 25, whereby this arm itself is fastened by means of screws 69 to the tubular sleeve 46 designed as mentioned above. In this device, the tools 40 are subjected to a main motion of permanent rotation, just as has been described above, whereas their additional reciprocating circular motion is produced by shaft 57 which itself is subjected to a reciprocating circular motion resulting from pressure of cam 50 upon roller 55 and on lever 56, whereby this reciprocating circular motion is transmitted in a proportional manner to the tubular sleeve 46 by the connecting rod 63 and the arm 67. The presence of slide 60 makes it possible to adjust aforesaid connecting rod 63 and hence the amount of additional reciprocating motion of the tool whilst the latter is cutting, considering that it is enough to untighten nut 64, to move pivot 61 into the required position with respect to aforesaid slide 60 and, finally, to retighten aforesaid nut 64.

The machine which has thus been fitted, operates in the following way:

The workpiece 70 is, in the well known way, fastened to the holder and the latter is then correctly disposed and adjusted by adequately moving the mobile base 6, the support 7 and the toolholder-slider 9 is such manner that aforesaid workpiece is properly situated in front of the tool 40. Aforesaid workpiece 70 will then, in the well known way, be displaced axially and with respect to its angular position in accordance with the successive phases of the cutting process, considering that each flank is cut in a single step. Similarly, the tool 40 will be brought into the correct relative position, also in the well known manner, by proper displacement of the toolholder along the rack 15 of the slider 4, along its guides 71–72 and by the angular adjustment of cradle 3. These preliminary adjustments may for instance be similar to those described in detail in aforementioned U.S. Patent No. 2,000,015. The motor 10 being started, imparts a rotary motion to the shaft 19 via the pinion 73 keyed onto axis 74, the chain 75, the pinion 76, the shaft 77 and the pinions 78–79. By means of the devices described above, shaft 19 drives the bevel wheel 28 and the toothed plate 32. The latter drives, by means of connecting rod 34, the shaft 38 and hence the cutter 40. It also drives pinion 49 and cam 50, thus rocking shaft 57 which, by means of connecting rod 63, transmits its motion to the tubular sleeve 46. The resulting motion of the tools 40 is therefore exactly as required by the characteristic process of the present invention, considering that the subsidiary motion which is additional to the actual cutting motion is actually taking place in a direction at right angles to the general direction of the teeth.

It should be noticed that this toolholder device with its driving means is of a very compact and sturdy design which moreover lends itself to be applied to any kind of machine.

Concerning the predetermination of the sense and the stroke to be imparted to the cutter, these will depend on the type and diameter of the cutters which are being used.

Figure 39:
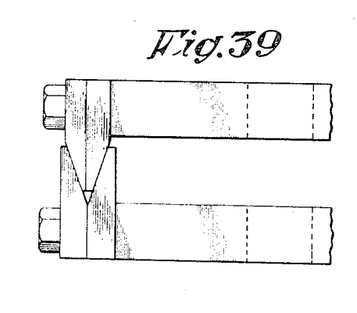
FIGURES 39 and 40 illustrate respectively a pair of male and female cutters and a pair of male cutters.

If for instance, use is being made of a set of male cutters for one member and a set of female cutters for the other member (cf. FIGURE 39) providing a complete bearing surface which is too long, the process conforming to the present invention makes it possible, by an adequate choice of the sense and the amplitude of the motion of the axis, to bring down this bearing surface to the required dimensions.

Figure 40:
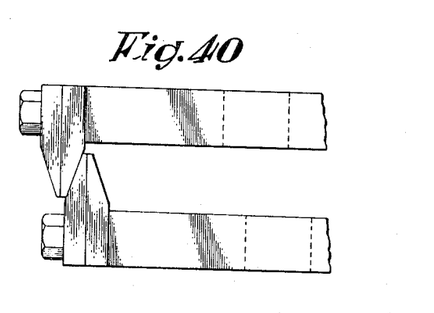

If, on the other hand, use is being made of two sets of male cutters (cf. FIGURE 40), with signal step cut for producing teeth of constant height, it is well known that the mean radius of the cutter must follow the formula A.sin.X in which A is the mean generatrix and X is the angle of the spiral. In this case, the bearing surface is too short. The process of the present invention does hold, however, as in this case it is enough to invert the sense of motion with respect to the preceding one and, of course, to choose the amplitude of the necessary motion for obtaining the reduced size.

The description which has been given above refers to the face mill cutters system. These tools have the considerable advantage that, on account of the large number of cutters put into play, they yield a very high production. On the other hand, when cutting by the "jobbing" method, e.g. for making prototypes or very small series, it is sometimes desirable to use less costly tools which, whilst yielding a more limited production, have however the advantage of an easier adjustment.

The process conforming to the present invention is also perfectly adapted to this kind of cutter, as will be described hereafter with reference to FIGURES 7 and 17 to 38.

In this example, the subsidiary translatory motion of the cutter axis takes place in the axial direction. For this purpose, as illustrated more particularly in FIGURES 17 to 27, the toolholder 5 consists of a housing 25 of cylindrical shape, containing a coaxial sleeve 80, which latter is supported by ball-bearings 81 and 82. The housing 25 as well as the sleeve 80 both consist of several sections assembled by bolts, 83–84 respectively.

Figure 17:
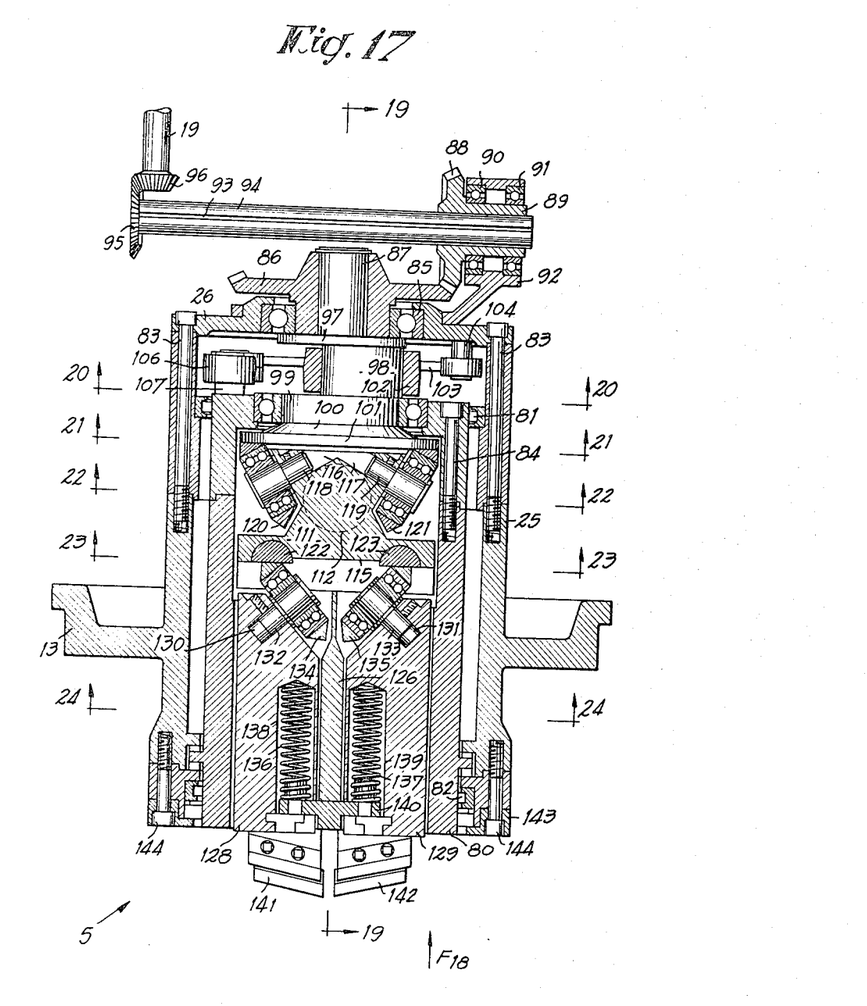
FIGURE 17 is a view similar to that of FIGURE 11, but shows another form of embodiment of a toolholder applying the process according to the present invention.
Figure 18:
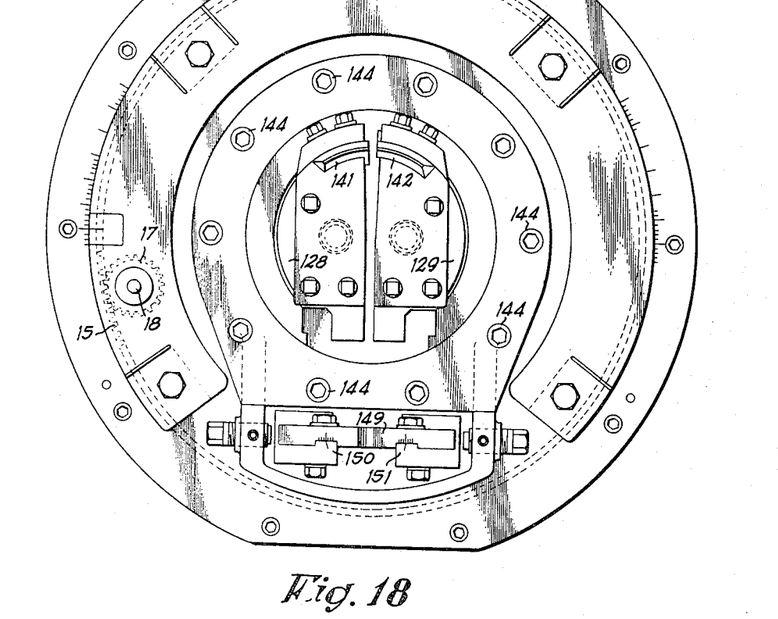
FIGURE 18 is a view in the direction of arrow F18 of FIGURE 17.
Figure 19:
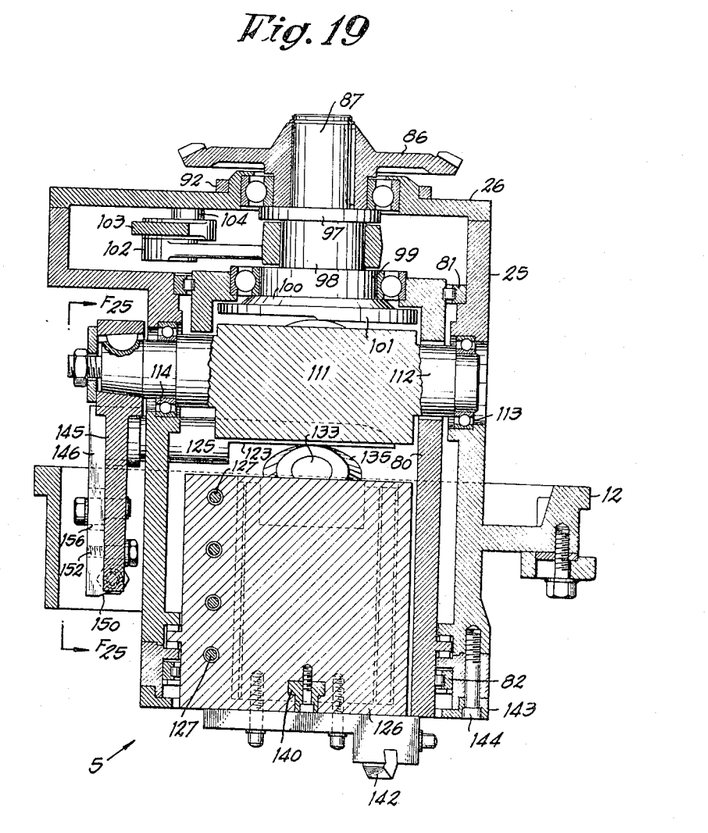
FIGURE 19 is a cross-section along the line 19—19 of FIGURE 17.
Figure 20:
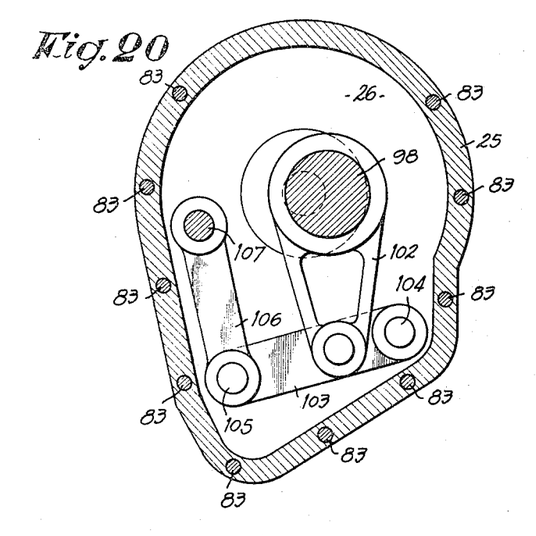
FIGURES 20, 21, 22, 23 and 24 are, respectively, cross sections along the lines 20—20, 21—21, 22—22, 23—23 and 24—24 of FIGURE 17.
Figure 21:
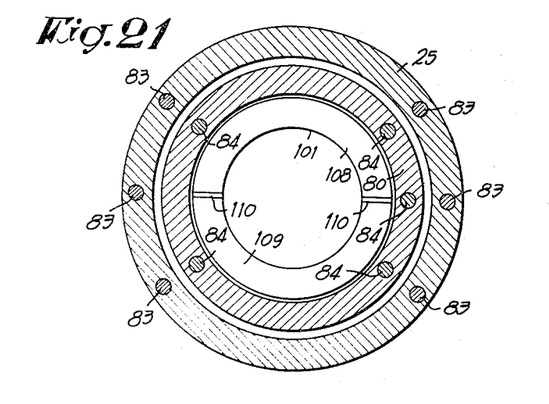
Figure 22:
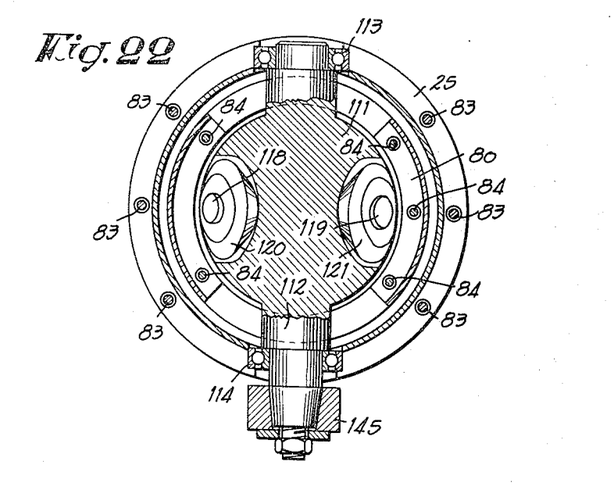
Figure 23:
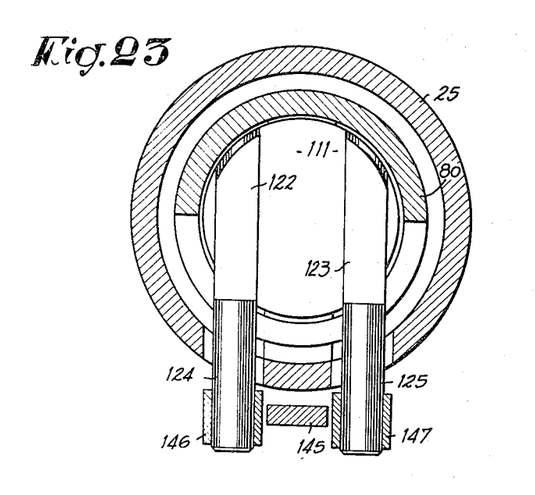
Figure 24:
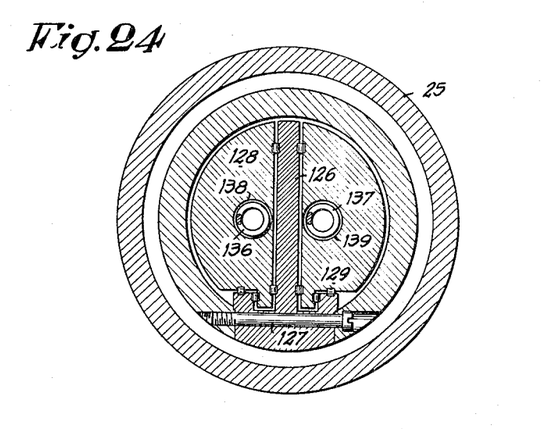

The rear flange 26 of housing 25 is provided with a ball-bearing 85 supporting the hub of a bevel wheel 86 which is itself fastened onto shaft 87 which traverses aforesaid flange. Aforesaid bevel wheel 86 engages a pinion 88 of which the hub 89 is seated, via ball-bearing 90–91 in a support 92 fastened to aforesaid flange 26.

Aforesaid hub 89 has an axial bore fluted so as to engage the corresponding ribs 93 of a shaft 94. The latter carries a toothed wheel 95 engaged by a pinion 96 which is carried at the end of aforesaid drive shaft 19 belonging to the driving mechanism described above and also common to the various variants.

Aforesaid shaft 87 is extended, toward the inside of housing 25, by the following succession of parts: a plate 97, an excentric shaft stump 98, a shaft stump 99, a conical connection 100 and a cam-plate 101. Onto the excentric stump 98 is mounted a connecting rod 102 hinged on a lever 103 which is itself pivoted at one end onto shaft 104 carried by the inner face of rear flange 26. The other end of aforesaid lever 103 is hinged in 105 on one end of a lever 106 of which the other end is fastened to a shaft 107 carried by aforesaid sleeve 80. This arrangement results in that any continuous rotation of axis 87 corresponds to a reciprocal rotation of sleeve 80.

The free face of the cam-plate 101 is provided with an annular track made of two sections 108 and 109, of 180° each and contained respectively in parallel planes, whereby these sections are connected by inclined planes 110.

A sleeve 80 contains a body 111 which can pivot about the axis 112 the ends of which are supported by ball-bearings 113 and 114 fastened to the housing 25. This body 111 has on one side a circular face 115 which is practically at right angles to the axis of sleeve 80 and the diameter of which is slightly less than the inner diameter of the corresponding part of aforesaid sleeve and, on the other side, two hollows 116 and 117 for housing the axes 118 and 119 respectively, carrying rollers 120 and 121 respectively. These rollers rest on aforesaid track 108–109 of the cam-plate 101.

Aforesaid circular face 115 comprises two parallel semi-cylindrical hollows which are symmetrically disposed on either side of the longitudinal median plane of sleeve 80 containing the axis 112 and parallel to the latter. It is in these hollows that are disposed the semi-cylindrical end parts 122–123 of two rods 124 and 125 respectively.

Below the body 111, aforesaid sleeve 80 is provided with a flat diametrical partition 126 fastened to it by the bolts 127. Two cutter-holders 128 and 129 respectively, are housed in the two housings of semi-cylindrical shape limited in aforesaid sleeve 80 by aforesaid partition 126. On their inner face, these cutter-holders are provided with a housing, 130 and 131 respectively, accommodating an axis 132 and 133 respectively carrying a roller 134–135 respectively. The latter are brought into contact with the plane faces 122 and 123 respectively of aforesaid semi-cylindrical rods 124 and 125 by means of springs 136 and 137 provided respectively in the housings 138 and 139 of aforesaid cutter-holders 128 and 129. These springs rest against a cross-piece 140 carried by aforesaid partition 126. The actual cutters 141 and 142 are fastened to the cutter-holders, preferably with a possibility of adjustment by known means.

The sleeve 80 is held in the housing 25 by a ring 143 fastened to the latter by bolts 144.

Figure 25:
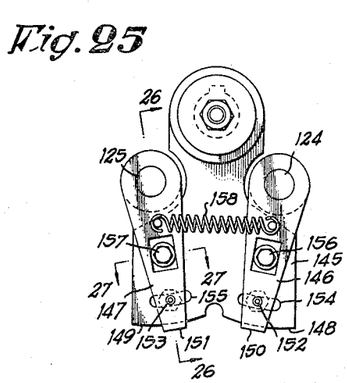
FIGURE 25 is a view in the direction of arrows 25 of FIGURE 19.
Figure 26:
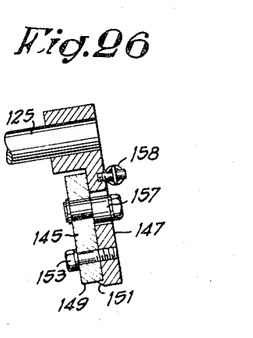
FIGURES 26 and 27 are, respectively, cross-sections along the lines 26—26 and 27—27 of FIGURE 25.
Figure 27:
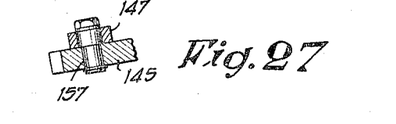
Figure 28:
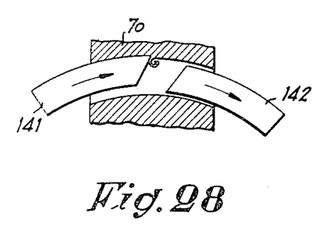
FIGURES 28 and 29 show diagrammatically the action of one or the other cutter in the form of embodiment illustrated in FIGURES 17 to 27.
Figure 29:
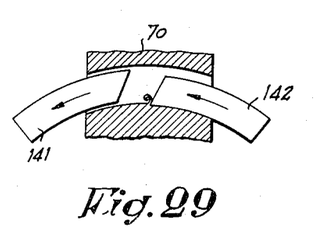
Figure 30:
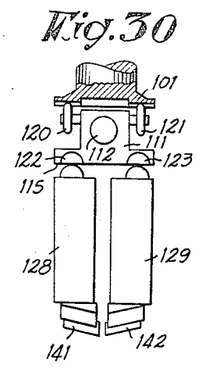
FIGURES 30, 31 and 32 illustrate schematically the relative motions of the cutters brought alternately in the cutting position and in the retracted position.
Figure 31:
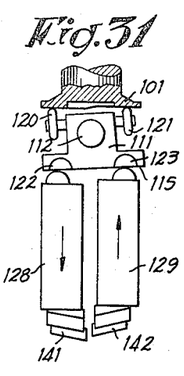
Figure 32:
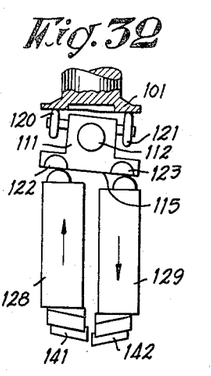
Figure 33:
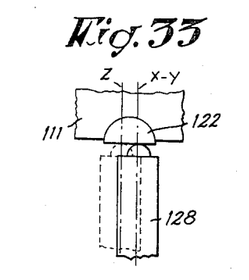
FIGURES 33, 34, 35, 36, 37 and 38 are diagrammatic representations of the successive operating steps of the device which controls the additional motions of the cutters for adjusting the contact area.
Figures 34, 35:
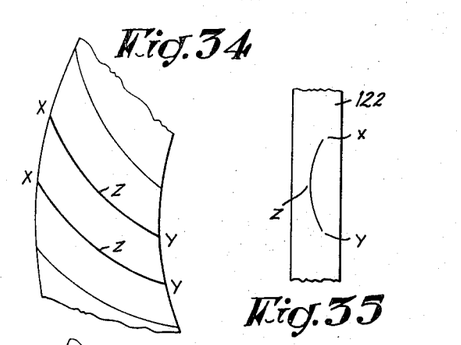
Figure 36:
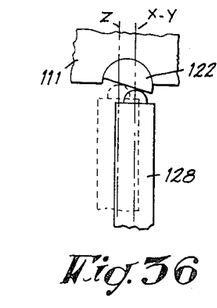
Figures 37, 38:
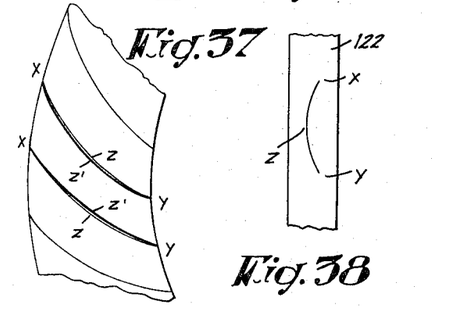

A plate 145 is fastened to the lowest end of axis 112, whilst a lever 146 and 147 is fastened to the lower part of each one of aforesaid rods 124 and 125. Aforesaid plate 145 has, at its free end, two curved surfaces 148 and 149 of which the centers of curvature are situated respectively on aforesaid axes of the rods 124 and 125.

The levers 146 and 147 have, at their free end, a curved finger 150 and 151 respectively, extending over part of the height of aforesaid surfaces 148 and 149.

The angular position of each one of aforesaid levers 146 and 147, with respect to the axis of plate 145 can be altered. For this purpose, each one of these levers is bolted to aforesaid plate by means of a bolt, 152 and 153 respectively, extending through openings 154 and 155 provided in aforesaid plate 145. After loosening either of these bolts 152–153, the angular position of the corresonding lever can be adjusted by means of the excentric axis 156, respectively 157. Aforesaid levers 146–147 are moreover permanently urged toward each other by the spring 158.

Each of aforesaid surfaces 148–149 is provided with a graduated scale and each one of the fingers 150–151 carries an index of which the function will be explained presently. Concerning the means for driving the toolholder which has thus been designed and its cradle 3, they may be similar to those described in the previous example.

The operation of this machine applying the process according to the present invention is quite simple, considering that the shaft 19 is maintained in continuous rotation and that the workpiece 70 is being moved by means similar to those which have already been described in the previous example.

The driving means of the tool-holder and its cradle in the example shown, are substantially as follows: the tool inlet shaft 19 is made to rotate as has already been described in the previous example, by motor 10 via sprocket 73, chain 75, sprocket 76, shaft 77 and the toothed wheels 78–79. The rotation of aforesaid shaft 19 drives, via pinions 96–95, shaft 94, pinions 88–86, the multiple section shaft 87, 97, 98, 99, 100 and 101. The connecting rod 102 therefore imparts a reciprocating motion to the lever 103 about shaft 104, whereby aforesaid lever 103 transmits, via pivot 105, lever 106 and shaft 107, an alternating rotary motion to the sleeve 80. The latter drives the cutter-holders 128–129 respectively and hence also the actual cutters 141–142. The rotary motion of the cam-plate 101 imparts to the body 111 an alternating rotary motion about its axis 112 since the rollers 120–121 are situated alternately on track 108 and on track 109 of aforesaid cam-plate 101. Due to its oscillation, aforesaid body 111 imparts to aforesaid cutter-holders 128–129 a reciprocating linear motion which is diagrammatically illustrated in FIGURES 30 to 32. The main object of this rocker motion is to feed forward the cutter until it reaches its cutting position, whilst the cutter which has just been cutting is moved back in order not to tailtouch during its return stroke, as illustrated diagrammatically in FIGURES 28 and 29. But the angular displacement of the cutter-holders 128–129, with respect to body 111 of which the face 115 is no longer at right angles to the cutter-holder head, gives rise to a slight additional motion of aforesaid cutter-holders, whereby the value and the sense of this displacement are well defined.

During the alternating rotary motions of the sleeve 80 and the linear motions of aforesaid cutters 141–142, the cradle 3 is, just as in the previous examples, carrying out an alternate rotary motion caused by a mechanism such as that which has been described in aforesaid U.S. Patent No. 2,000,015 taken by way of example.

In order to change, respectively to adjust the reduced bearing surface, it is enough in this machine, to displace in adequate sense and by an adequate amount both levers 146–147, which is in fact rendered quite easy by the presence of reference marks on the adjacent edges 148–149 respectively of plate 145 and of the base line carried by the curved fingers 150–151 of aforesaid levers 146–147. This operation must of course be preceded by a loosening of the bolts 152–153. The adjustment is provided by actuating in the proper sense the excentric axes 156–157. The angular displacement of levers 146–147 causes the rotation of rods 124–125 and the angular displacement of the flats of the semi-cylindrical ends 122–123. It is in this way that the characteristics of the tracks which control the reciprocating linear motions of the cutter-holders 128–129 are modified. For correct operation, i.e. for a permanent contact between aforesaid tracks closed by the flat parts of aforesaid semi-cylindrical ends 122–123 and aforesaid cutter-holders 128–129 by way of the rollers 134–135, the latter are permanently pressed into firm contact with aforesaid tracks by means of the return-springs 136–137 respectively. This kind of operation is illustrated diagrammatically in FIGURES 33 to 38. Indeed, as shown diagrammatically in FIGURES 33 to 35, when the flats of the semi-cylindrical parts 122–123 are disposed at right angles to the general axis of the tool-holder, the subsidiary reciprocating rectilinear motion according to the process of the present invention has a given value. For changing this value, it is enough, by acting as described above, to change the position of aforesaid flats as illustrated diagrammatically in FIGURES 36 to 38. In fact, point Z, which is halfway or approximately halfway between the outer points X–Y of a tooth length, is moved by the predetermined amount to Z', which determines the reduced bearing surface.

These examples of machines which have been especially adapted for applying the same process can of course be carried out under various forms and for widely varying purposes. In fact, apart from the well defined process which is characterized by the additional motion of the tools, whilst they are cutting, in a direction which is at right angles or approximately at right angles to the general direction of the toothing, the present invention concerns any device and any machine of which the tool-holder and the driving means of the latter, respectively of the tools themselves, are designed in such way as to be able to give rise to this slight, correctly defined subsidiary motion.

What I claim is:

1. A process for cutting bevel and hyperboloid gears, characterized by the fact that it consists in imparting to the axis of the cutter, whilst the latter is cutting, a slight additional translatory motion in a direction which is practically at right angles to the general direction of the teeth, the change of sense of this additional motion taking place near the middle of the tooth width, and also characterized in that the translatory motion of the cutter axis which gives rise to the additional displacements of the latter in a direction which is practically at right angles to the general direction of the teeth, is an alternating circular motion.

2. Machine for cutting bevel and hyperboloid gears in a workpiece, comprising in combination with a tool-holder and a cutter, means for displacing, angularly displacing and fixing the workpiece; means for displacing, angularly displacing and fixing the tool-holder; means for imparting to the cutter a continuous rotary motion; means for imparting to the tool-holder and to the workpiece the necessary relative motion needed for forming the teeth and a means for imparting to the cutter, whilst the latter is cutting, a slight additional alternate circular motion.

3. Machine for cutting bevel and hyperboloid teeth in a workpiece, comprising, in combination with a tool-holder and a cutter, means for displacing, angularly displacing and fixing the workpiece; means for displacing, angularly and fixing the tool-holder means for imparting to the cutter an alternate circular motion as well as a reciprocating rectilinear motion, in order to successively withdrawing and putting forward the cutting blades to correct position, respectively at the end and at the beginning of a cutting operation of each blade; means for imparting to the tool-holder and the workpiece the relative motion needed for forming the teeth and a means for imparting to the cutter, whilst the latter is cutting, a slight additional alternate circular motion in a direction which is practically at right angles with the general direction of the teeth and for changing the sense of this additional motion about halfway the width of the toothing.

References Cited
UNITED STATES PATENTS

| | | | |
|---|---|---|---|
| 1,709,835 | 4/1929 | Bottcher | 90—5 |
| 2,059,613 | 11/1936 | Schellens | 90—5 |

WILLIAM W. DYER, Jr., *Primary Examiner.*

GERALD A. DOST, *Examiner.*